Feb. 1, 1966  A. ARRIGHINI  3,232,259
METHOD OF MAKING A CLAMP BODY MEMBER
Filed Aug. 14, 1961  2 Sheets-Sheet 1
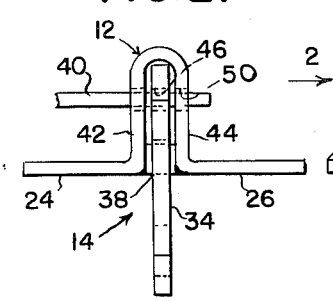
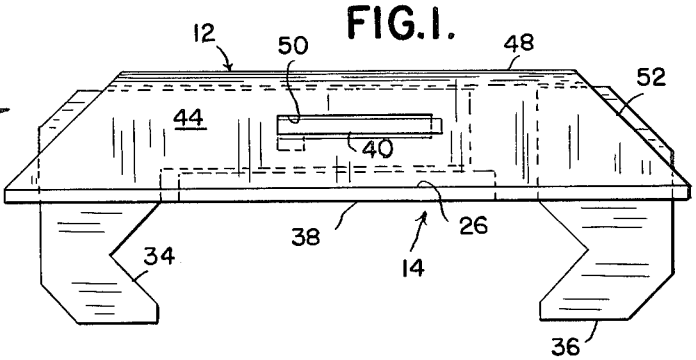
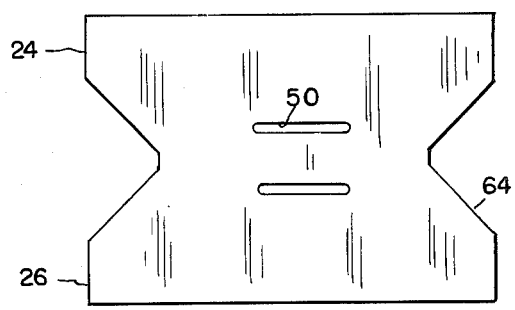
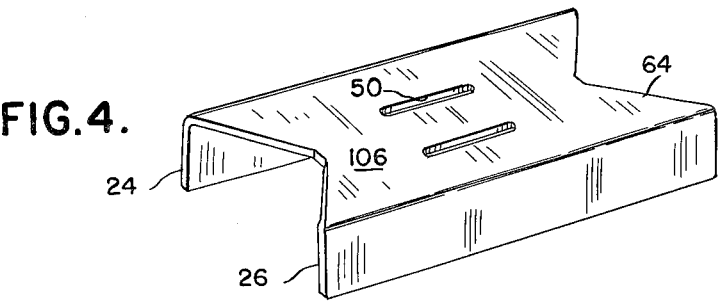
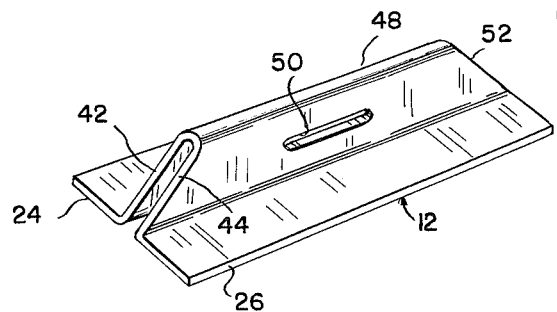
INVENTOR.
ARTIL ARRIGHINI
BY Whittemore
Hulbert & Belknap
ATTORNEYS

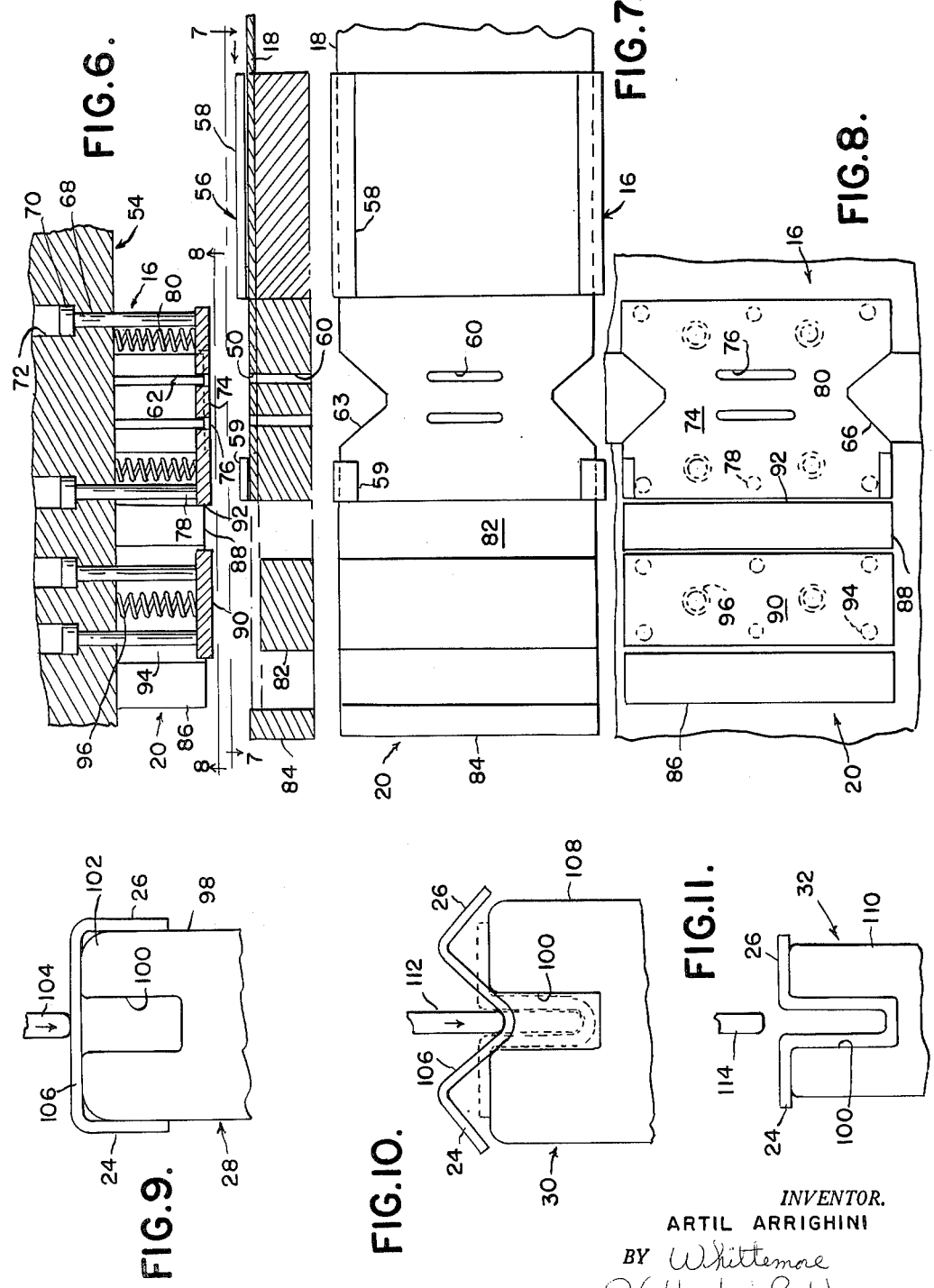

United States Patent Office 3,232,259
Patented Feb. 1, 1966

3,232,259
METHOD OF MAKING A CLAMP BODY MEMBER
Artil Arrighini, Southfield, Mich., assignor to Rocform Corporation, Oak Park, Mich., a corporation of Michigan
Filed Aug. 14, 1961, Ser. No. 131,156
1 Claim. (Cl. 113—116)

The invention relates to clamping devices and refers more particularly to a method of making a flanged and slotted U-shaped body member of a clamping device for clamping concrete forms or the like together.

Clamping devices having body members of the general form of the body member constructed by the method and apparatus of the invention are known. Such body members have previously been formed of angle members positioned back-to-back in conjunction with a connecting member extending between and welded to the outer edges of the adjacent legs thereof. This construction requires the separate forming of a plurality of individual pieces and the subsequent welding thereof into a finished clamp body member. With such construction forms are also necessary to hold the individual members in the desired relation while welding thereof is performed. Such methods and means for producing flanged and slotted U-shaped clamp body members is wasteful of both production apparatus and the time of skilled labor.

It is therefore one of the objects of the present invention to provide an improved method of forming a clamp body member from a single sheet of formable material.

Another object is to provide a method of forming a clamp body member from a continuous sheet of material comprising stamping the end of the continuous sheet of material to provide a desired configuration, shearing the stamped end from the continuous sheet of material, bending opposite edges portions of the sheared end of the continuous sheet of material at right angles thereto, and open return folding the central portion of the sheared end of the sheet of material in a direction opposite to the direction of bending of the edge portions thereof.

Another object is to provide a method of making a flanged and slotted U-shaped body member for a clamp device or the like comprising means for stamping the end of a continuous sheet of material into a desired slotted and recessed configuration, means for guiding the end of the continuous sheet of material through the stamping means, means for shearing the formed end of the continuous sheet of material from the sheet of material and for bending opposite edges of the sheared end of the continuous sheet of material substantially perpendicularly thereto, and means for open return folding the central portion of the sheared end of the continuous sheet of material.

Another object is to provide a method of producing a clamp body member which is simple, economical and efficient.

Other objects and features of the invention will become apparent as the description proceeds, especially when taken in conjunction with the accompanying drawings, illustrating preferred embodiments of the invention, wherein:

FIGURE 1 is an elevation view of an assembled clamp for clamping adjacent concrete forms together including a clamp body member constructed by the apparatus and method of the invention.

FIGURE 2 is a partially broken away end view of the assembled clamp shown in FIGURE 1 taken in the direction of arrow 2 in FIGURE 1.

FIGURE 3 is a plan view of a stamped and sheared end of a continuous sheet of material from which the clamp body member illustrated in FIGURES 1 and 5 is produced.

FIGURE 4 is a perspective view of the stamped and sheared end of a continuous sheet of material shown in FIGURE 3 with opposite edge portions thereof bent at ninety degrees thereto.

FIGURE 5 is a perspective view of the finished clamp body member shown in FIGURE 1 constructed from the stamped, sheared and bent end of a continuous sheet of material shown in FIGURE 4 by open return folding of the central portion of the structure illustrated in FIGURE 4 in a direction opposite to the direction of bend of the edge portions thereof.

FIGURE 6 is a longitudinal section view of a portion of the apparatus for making the clamp body member illustrated in FIGURE 5.

FIGURE 7 is a top view of the lower die shown in FIGURE 6 taken in the direction of arrows 7—7 in FIGURE 6.

FIGURE 8 is a bottom view of the top die illustrated in FIGURE 6 taken along the line 8—8 in FIGURE 6.

FIGURE 9 is a side elevation of the apparatus for central open return folding of the structure illustrated in FIGURE 4.

FIGURE 10 is a modification of the apparatus illustrated in FIGURE 9 for central open return folding of the structure illustrated in FIGURE 4.

FIGURE 11 is another modification of the apparatus illustrated in FIGURE 9 for central open return folding of the structure illustrated in FIGURE 4.

With particular reference to the drawings one modification of the present invention will now be considered.

The body member 12, shown best in FIGURE 5, of the clamp 14 of FIGURE 1 for clamping concrete forms together is produced by the apparatus illustrated in FIGURES 6–11 in accordance with the method of the invention. The apparatus shown in FIGURES 6–11 comprises means 16 for stamping the end of a continuous sheet of formable material 18 into a desired configuration, as shown in FIGURE 3, and means 20 for shearing the stamped end from the continuous sheet of material 18 and for bending the edge portions 24 and 26 at right angles thereto, as shown in FIGURE 4.

The apparatus for making the body member 12 further includes the means 28 illustrated in FIGURE 9 for central open return folding of the structure illustrated in FIGURE 4. Modifications 30 and 32 of the means illustrated in FIGURE 9 are illustrated in FIGURES 10 and 11 respectively.

The method of producing the clamp body member 12 comprises first stamping the end of the continuous sheet of material 18 into the configuration illustrated in FIGURE 3, next shearing the end from the continuous sheet of material 18 and bending the edge portions 24 and 26 at right angles thereto. The stamping, shearing and bending operations are followed by central open return folding of the structure illustrated in FIGURE 4.

More specifically the clamp 14 includes the flanged and slotted U-shaped body member 12 produced by the method and apparatus of the invention, the two hook members 34 and 36, the guide spacer 38 and the clamp pin 40. The hook members 34 and 36 may be produced from rigid sheet material by stamping in the configuration illustrated best in FIGURE 1. Hook member 36 is rigidly secured between the parts 42 and 44 of the U-shaped portion 48 of the clamp body member 12 by welding or similar means while the hook member 34 is slidably guided between the parts 42 and 44 of the clamp body member 12 by the guide spacer 38. The hook 34 is provided with a slot 46 therein, part of which is adapted to be aligned with the slots 50 in the clamp body member 12, whereby the clamp 14 is secured in clamped position, on adjacent concrete wall forms for example, by means of the tapered clamp pin 40 extending through the aligned portions of the slots 46 and 50.

As previously indicated clamps 14 are generally known in the art and do not form a part of the present invention. However in the past the body member 12 including the U-shaped portion 48 having aligned through slots 50 in parts 42 and 44 thereof, tapered ends 52 and the flanges 24 and 26 secured to the free edges of the parts 42 and 44 of the U-shaped portion 48 have been produced by methods and apparatus wasteful of both material and time. In accordance with the invention an improved apparatus for and method of producing the body member 12 of the clamp 14 is provided.

The means 16 for stamping the end of the continuous sheet of bendable material 18 into a desired configuration, as shown in FIGURE 3, and the means 20 for shearing the end from the sheet of material 18 and bending opposite edge portions 24 and 26 thereof at right angles thereto include common upper and lower die members 54 and 56. The die members 54 and 56 are relatively movable toward and away from each other and operate on successive reciprocations toward and away from each other to progressively form the end of the continuous sheet of material 18 into the structure shown in FIGURE 4.

The means 16 more specifically includes the L-shaped guides 58 and 59 at both edges of the lower die 56 having portions extending upwardly and then inwardly of the die 56 whereby the continuous sheet of material 18 is held in vertically fixed position as it is passed between the dies 54 and 56.

The means 16 further includes the parallel spaced apart slots 60 extending transversely of the bottom die 56 and the end 22 of the elongated sheet of material 18. Mating fixed shear blades 62 are provided on the upper die 54. The shear blades 62 are operable in conjunction with the slots 60 to cut the slots 50 in the end of the continuous sheet of material 18 on relative movement of the upper and lower dies 54 and 56 toward each other.

Similarly the lower die member 56 is provided with generally triangular recesses 63 in the opposite sides thereof, as shown best in FIGURE 7, while the upper die member 54 is provided with similarly shaped shear members 66 illustrated in FIGURE 8 which cooperate on relative movement of the dies 54 and 56 toward each other to cut the triangular notches 64 in the end of the continuous sheet of material 18. Thus, it will be evident that with the end 22 of the continuous sheet of material 18 guided between the dies 54 and 56 in the position shown best in FIGURES 6 and 7 that the end is shaped in the configuration shown in FIGURE 3 on movement of the dies 54 and 56 toward each other.

The upper die 54 is also provided with sliding guide pins 68 having heads 70 which guide pins are reciprocal within the cylindrical recesses 72 in the upper die 54. A stripper plate 74 having slots 76 therein for passage therethrough of the shear blades 62 is secured to the ends 78 of the pins 68, as shown in FIGURE 6. The stripper plate 74 is urged by the springs 80 into the position illustrated in FIGURE 6 whereby the end of the continuous sheet of material 18 is mechanically stripped from the upper die 54 on movement of the upper die 54 away from the lower die 56.

The means 20 for shearing the end from the continuous sheet of material 18 and for turning the opposite edge portions 24 and 26 of the sheared end at right angles thereto includes the transverse slots 82 in the lower die 56 and the abutment 84 at the end of the lower die 56. The apparatus 20 further includes the bending abutment 86, bending and shearing abutment 88 and the spring loaded stripper plate 90 carried by the upper die 54, as shown best in FIGURE 6.

In operation, the continuous sheet of material 18 is advanced from the position shown in FIGURE 7 to a position wherein it abuts against the abutment 84 after having been stamped in the configuration illustrated in FIGURE 3. The stamped end of the continuous sheet of material 18 is then first sheared from the remainder of the continuous sheet of material 18 by the shearing edge 92 of the bending and shearing abutment 88 on movement of the dies 54 and 56 toward each other. The edge portions 24 and 26 of the stamped and sheared end of the continuous sheet of material 18 are bent at right angles to the sheet by abutments 86 and 88 on continued movement of the dies 54 and 56 toward each other to form the structure illustrated in FIGURE 4.

During this operation the stripper plate 90 mounted on the slidable guide pins 94 and urged toward the bottom die 56 by the spring 96 operates to maintain the end of the continuous sheet of material 18 in position during the shearing operation and to strip the structure illustrated in FIGURE 4 from the abutments 86 and 88 on separation of the die members 54 and 56.

The forming of the body member 12 of the clamp 14 in the configuration shown in FIGURE 5 is completed with the means illustrated in FIGURE 9. Thus the structure of FIGURE 4 is placed over a male die 98 having a transversely extending recess 100 therein and rounded transverse outer edges 102. An upper male die member 104 is then forced into the recess 100 thereby open return folding the structure illustrated in FIGURE 4 centrally to provide the finished body member 12.

With regard to the structure illustrated in FIGURE 9 it will be particularly noted that the die 98 is of substantially the same width as the central portion 106 of the structure shown in FIGURE 4. Thus it is necessary to round the transverse edges 102 of the die 98 considerably to prevent binding of the structure shown in FIGURE 4 with the die 98 on movement of the dies 98 and 104 toward each other.

In the modification 30 of the means 28 illustrated in FIGURE 10 the lower die 108 is made substantially wider than the central portion 106 of the structure illustrated in FIGURE 4 so that the open return folding of the structure illustrated in FIGURE 4 is started with the structure of FIGURE 4 setting on the end of the die member 108. Thus the necessity for rounded edges on the lower die 108 is removed at the sacrifice of easily accurately centering the structure of FIGURE 4 on the die member 108.

In the modification 32 of the means 28 shown in FIGURE 11 the structure shown in FIGURE 4 is positioned over a die member 110 having a width substantially less than the width of the central portion 106 of the member shown in FIGURE 4 whereby it is similarly unnecessary to provide rounded transverse edges thereon but again centering of the structure shown in FIGURE 4 on the die 110 is sacrificed.

The complete forming of the body member 12 of the clamp 14 will now be considered in connection with the operation of the apparatus illustrated in FIGURES 6–11. Thus with the dies 54 and 56 positioned as shown in FIGURE 6, the end of a continuous strip of formable material 18 is fed through the guides 58 and 59 into the position shown in FIGURES 6 and 7. The dies 54 and 56 are then caused to move toward each other whereby the blades 62 and members 66 form the end of the continuous sheet of material 18 into the configuration shown in FIGURE 3.

The dies are then moved away from each other with the stripper plate 74 helping in the removal of the end of the continuous sheet 18 from the upper die 54. The continuous sheet 18 is then moved into position whereby the end thereof abuts the stop 84. The dies 54 and 56 are again moved toward each other. The end of the continuous sheet 18 is thus sheared from the sheet 18 by the shear edge 92 of the abutment 88 and in the same operation the edge portions 24 and 26 are turned at right angles to produce the structure shown in FIG- URE 4. Also, during this operation a new end portion of the continuous sheet 18 formed by shearing of the previous end portion from the continuous sheet 18 is formed as shown in FIGURE 3 by the apparatus 16.

The dies 54 and 56 are then again moved away from each other and the structure shown in FIGURE 4 is stripped from the upper die 54 with the aid of the stripper plate 90. The structure shown in FIGURE 4 is then placed on one of the dies 98, 108 or 110, illustrated in FIGURES 9–11 and a die 104, 112 or 114 associated with the respective die 98, 108 or 110 in FIGURES 9–11 is moved relatively toward the die 98, 108 or 110 whereby the structure shown in FIGURE 4 is open return folded centrally to produce a finished clamp body member 12 as shown best in FIGURE 5.

The drawings and the foregoing specification constitute a description of the improved method of and means for making a clamp body member in such full, clear, concise and exact terms as to enable any person skilled in the art to practice the invention, the scope of which is indicated by the appended claim.

What I claim as my invention is:

1. The method of forming a clamp body member comprising moving an elongated substantially flat sheet of material into end engagement with an abutment with the end portion thereof aljacent the abutment being positioned over a male die member and beneath a bending abutment at the side of the male die member adjacent the end abutment and a bending and shearing abutment positioned at the opposite side of the male die member and with the portion of the sheet of material adjacent said end portion being positioned over a female shearing die and beneath complementary male shearing dies, stamping said adjacent portion of the sheet into a desired configuration with medial apertures, shearing the end portion from the remainder of the sheet and bending the edge portions of the end portion which are in abutment with said end abutment and formed by the shearing die respectively substantially at right angles to said end portion of said sheet to form a channel shaped member all in a single stamping, shearing and bending operation, subsequently removing the stamped and bent end portion sheared from the sheet of material from the male die member, providing a second male die member with a transverse dimension equal to the dimension between the bent down edge portions of the channel shaped member, forming rounded longitudinal edges on the second male die member and providing a longitudinally extending recess in the second male die member substantially centrally thereof, aligning the channel shaped member over the recess on the second male die member with the inner surface of the bent down edge portions thereof in surface-to-surface contact with the sides of the second male die member, and striking the channel shaped member with a third male die member in mating relation to the recess in the second male die member between said apertures to force the central portion of the channel shaped member to bend around the third male die member within said recess thereby to displace said bent down edge portions into spaced coplanar relationship.

References Cited by the Examiner
UNITED STATES PATENTS

| | | |
|---|---|---|
| 381,175 | 4/1888 | Schoen. |
| 923,036 | 5/1909 | Ebbels _____ 29—526 |
| 1,651,923 | 12/1927 | Kenney. |
| 1,709,110 | 4/1929 | Bessonett. |
| 1,813,579 | 7/1931 | Mallina. |
| 1,931,469 | 10/1933 | Davies _____ 113—116 X |
| 2,092,255 | 9/1937 | Keller _____ 153—2 |
| 2,226,819 | 12/1940 | Jeffries _____ 29—526 |
| 2,233,719 | 3/1941 | Vanderveld _____ 29—155 |
| 2,262,550 | 11/1941 | Hunter _____ 153—2 |
| 2,596,375 | 5/1952 | Daniels _____ 29—551 X |
| 2,834,392 | 5/1958 | Norton _____ 153—2 |
| 2,878,771 | 3/1959 | Grau _____ 113—116 |
| 3,008,441 | 11/1961 | Schonitzer _____ 113—116 |

WHITMORE A. WILTZ, *Primary Examiner.*

NED BERGER, RICHARD H. EANES, *Examiners.*